(12) United States Patent
Fries et al.

(10) Patent No.: US 6,979,357 B2
(45) Date of Patent: *Dec. 27, 2005

(54) METHOD OF PRODUCING ULTRA-HARD ABRASIVE PARTICLES

(75) Inventors: Robert Fries, Johannesburg (ZA);
Iakovos Sigalas, Johannesburg (ZA);
Manfred Nebelung, Dresden (DE);
Geoffrey John Davies, Randburg (ZA)

(73) Assignee: Mehmet Serdar Ozbayraktar, Alberton (ZA)

( * ) Notice: Subject to any disclaimer, the term of this patent is extended or adjusted under 35 U.S.C. 154(b) by 0 days.

This patent is subject to a terminal disclaimer.

(21) Appl. No.: 10/415,345

(22) PCT Filed: Nov. 6, 2001

(86) PCT No.: PCT/IB01/02072

§ 371 (c)(1),
(2), (4) Date: Sep. 24, 2003

(87) PCT Pub. No.: WO02/38264

PCT Pub. Date: May 16, 2002

(65) Prior Publication Data

US 2004/0076748 A1    Apr. 22, 2004

(30) Foreign Application Priority Data

Nov. 9, 2000    (ZA) ................................. 2000/6468

(51) Int. Cl.$^7$ ......................... C09K 3/14; B24D 18/00; B01J 3/06; B05D 7/00

(52) U.S. Cl. .................... 51/307; 51/309; 51/298; 51/293

(58) Field of Search ....................... 51/293, 307, 298, 51/309; 423/446

(56) References Cited

U.S. PATENT DOCUMENTS

2004/0060243 A1 *  4/2004  Fries et al. ................... 51/293

FOREIGN PATENT DOCUMENTS

| EP | 0 737 510 | 10/1996 |
|----|-----------|---------|
| JP | 59 164605 | 9/1984  |
| JP | 59 169993 | 9/1984  |
| JP | 01 038135 | 2/1989  |

* cited by examiner

*Primary Examiner*—Michael Marcheschi
(74) *Attorney, Agent, or Firm*—Oblon, Spivak, McClelland, Maier & Neustadt, P.C.

(57) ABSTRACT

A method of producing a plurality of discrete ultra-hard abrasive particles includes the steps of providing a plurality of granules, each comprising at least one ultra-hard abrasive particle, a precursor for the abrasive particle and a solvent/catalyst for the abrasive particle or precursor of such a solvent/catalyst, placing the granules with a separating medium between adjacent granules in the reaction zone of a high pressure/high temperature apparatus, subjecting the contents of the reaction zone to elevated temperature and pressure conditions at which the ultra-hard abrasive particle is crystallographically stable, recovering thus treated material from the reaction zone and removing the separating medium in the treated material to produce a plurality of discrete abrasive particles.

14 Claims, 1 Drawing Sheet

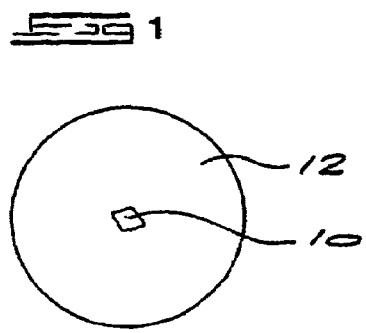
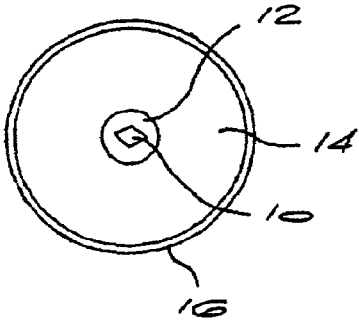
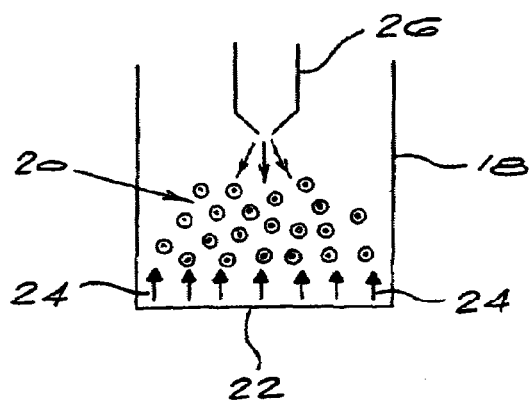
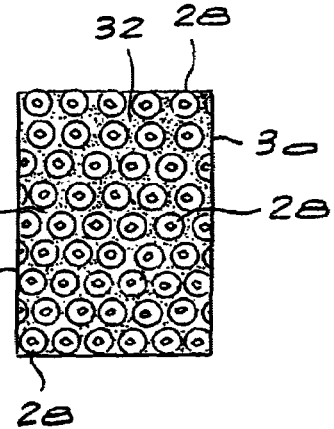

METHOD OF PRODUCING ULTRA-HARD ABRASIVE PARTICLES

BACKGROUND OF THE INVENTION

This invention relates to a method of producing ultra-hard abrasive particles, particularly diamond particles.

Methods of producing diamond and cubic boron nitride abrasive particles synthetically are well known in the art. The methods can be tailored to produce particles having particular characteristics. For example, the method may be tailored to produce friable diamond particles which are used in applications such as grinding. Alternatively, the method may be tailored to produce a strong blocky diamond of good quality. Such diamonds are typically used in saws and grinding applications.

Diamonds are synthesised by subjecting a carbon source i.e. a precursor of diamond, to elevated temperature and pressure conditions at which diamond is crystallographically stable, generally in the presence of a diamond solvent catalyst. Similarly, cubic boron nitride particles are synthesised by subjecting hexagonal boron nitride, i.e. the precursor of cubic boron nitride, to elevated temperature and pressure conditions at which cubic boron nitride is crystallographically stable in the presence of a solvent/catalyst for cubic boron nitride.

describes a method of synthesising diamond particles by coating fine diamond particles with at least one layer of a non-diamond carbon material, a catalyst/solvent in the form of a metal powder and an organic binder, compacting the coated particles in such a manner that they are at least partially in contact with each other, placing the compacted arrangement in a suitable synthesising vessel and subjecting the compacted arrangement to temperature and pressure conditions at which diamond is crystallographically stable.

The diamond which is synthesised is a relatively large diamond. This method of producing relatively large diamonds has several drawbacks. First, the fine particles are difficult to coat, particularly using the fluidisation method described in the patent. As a consequence, agglomeration of the seeds tends to occur. If larger particles are used as the seed, remnants of the seed can appear visibly in the synthesised diamond. Further, the seeds in the compacted arrangement are exposed to a variable environment during the growth stage. This variability results in variability in the diamond synthesised.

SUMMARY OF THE INVENTION

According to the present invention, a method of producing a plurality of discrete ultra-hard abrasive particles includes the steps of providing a plurality of granules, each comprising at least one ultra-hard abrasive particle, a precursor for the abrasive particle and a solvent/catalyst for the abrasive particle or precursor of such a solvent/catalyst, placing the granules with a separating medium between adjacent granules in the reaction zone of a high pressure/high temperature apparatus, subjecting the contents of the reaction zone to elevated temperature and pressure conditions at which the ultra-hard abrasive particle is crystallographically stable, recovering the thus treated material from the reaction zone and removing the separating medium in the treated material to produce a plurality of discrete abrasive particles.

BRIEF DESCRIPTION OF THE DRAWINGS

FIGS. 1 to 4 illustrate diagrammatically the steps of an embodiment of the method of the invention.

DESCRIPTION OF THE EMBODIMENTS

The method of the invention involves, as a first step, producing a plurality of granules. Each granule will contain an ultra-hard abrasive particle and preferably only one such particle. The granule also contains solvent/catalyst for the ultra-hard abrasive particle or a precursor of such a solvent/catalyst and a precursor for the ultra-hard abrasive particle. The granules will be a coherent mass of the various components in any suitable shape or size and may be produced by methods such as granulation, pelletising or spray coating.

The granules may contain an organic or inorganic binder. Examples of such binders are cellulose ethers, organic polymers and the like. Such binders will generally be removed prior to subjecting the granules to the high temperature/high pressure growth conditions.

The ultra-hard abrasive particles will generally be diamond or cubic boron nitride particles. The method has particular application to producing diamond particles. The particles in the granules will generally be fine, e.g. have a size of less than 100 microns. As mentioned above, the preferred form of the invention is that each granule contains a single ultra-hard abrasive particle only.

The solvent/catalyst or precursor thereof and the precursor for the ultra-hard abrasive particle may be provided in layer form or as a mixture in each granule, the latter being preferred. These components will generally be in powder form in the granules.

Solvent/catalysts for diamond and cubic boron nitride are well known in the art. Particularly suitable examples for diamond solvent/catalysts are transition metals such as cobalt, iron, nickel or alloys containing one or more of these metals. A precursor of the solvent/catalyst may also be used. Examples of diamond solvent/catalyst precursors are oxides such as nickel oxide, cobalt oxide or iron oxide or compounds which reduce or pyrolise to an oxide such as carbonates and oxalates of metals such as iron, cobalt or nickel. When precursors are used, it is preferred that the granules are subjected to a heat treatment to reduce the precursors to the metal prior to subjecting the granules to the high temperature/high pressure sintering. The heat treatment for the reduction will vary according to the nature of the granules, its content and the nature of the precursor. The precursors of the solvent/catalyst reduce to the metal in a particularly fine particle size such that a finely divided and homogeneous mixture of the components of the layer around the ultra-hard abrasive particle is provided.

The precursor for diamond will be a non-diamond carbon such as graphite or amorphous carbon. The precursor for cubic boron nitride will be hexagonal boron nitride.

In one form of the invention, the ultra-hard abrasive particles are each coated with a layer of solvent/catalyst prior to forming the granules. Preferably, the solvent/catalyst, when it is a metal, is applied to the abrasive particle by electroless coating.

A separating medium is provided between adjacent granules when they are in the reaction zone of the high pressure/high temperature apparatus. Preferably, the separating medium is applied as a coating to the granules prior to placing the granules in the reaction zone. The coating may be applied by methods known in the art. For example, the coating may be provided by spray coating in a fluidised medium. The separating medium must be of a material which does not interfere with the high temperature/high pressure treatment of the contents of the granules. Preferably the separating medium has the ability to transmit adequately the pressure which is generated in the reaction volume. It is also preferable that the separating medium is readily removed from the granule after treatment by dissolution in water or a dilute acid, optionally with the aid of sonification, or by mechanical means. Further, it is preferable that the separating medium is a good thermal conductor. Examples of suitable separating media are salt, graphite, hexagonal boron nitride, carbonates, oxides, phosphates and the like. The separating medium, in the case of diamond, can also be a metal such as molybdenum. The separating medium may comprise more than one layer.

The separating medium may be provided between adjacent granules in other ways. For example, the granules may be placed in a container, e.g. a capsule, and the separating medium, in powdered or liquid form, poured into the container and around the granules. If necessary, good dispersion and mixing can be assisted by some mechanical agitation or vibration to ensure that there are no gaps and the granules are all embedded and uniformly dispersed in the separating medium.

The separating medium ensures that granules are separated and that the ultra-hard abrasive particle in each granule is thus exposed to a uniform growth medium. Consequently, a more uniform and consistent diamond growth occurs. The separating medium provides a reaction barrier around each granule, and thereby also reduces the effect of temperature gradients in the reaction zone which otherwise result in inhomogeneous crystallisation throughout the reaction zone.

The granules may be selected on the basis of size. For example, granules of a preferred size may be selected by sieving from a bulk of granules, or by means of a cyclone or any other suitable size classification method.

Generally, the granules and separating medium, as a coating or otherwise, will be placed in a reaction capsule and pressed or compacted into the capsule to fill the space available.

The elevated temperature and pressure growth conditions to which the granules are subjected are well known in the art. Typical pressures are in the range of 3 to 8 GPa and typically temperatures are in the range of 1000 to 2100° C.

The treated material is removed from the reaction zone of the high temperature/high pressure apparatus. The material which is recovered is sintered and coherent and consists of a plurality of treated granules separated by the separating medium. The discrete individual ultra-hard abrasive particles can be released by first removing the separating medium and then removing residual solvent/catalyst and precursor. These recovery steps are known in the art.

An embodiment of the invention will now be described with reference to the accompanying drawing. Referring first to FIG. 1, a diamond seed 10, typically having a size of less than 100 microns, is coated with a layer 12, which completely encloses the seed 10, of a metal solvent/catalyst. An example of such a metal is nickel. This coating preferably takes place by electroless coating.

The coated diamond of FIG. 1 is then provided with a coating of solvent/catalyst or precursor thereof and a separating medium. One such method of coating is illustrated by FIG. 2. Referring to this Figure, a container suitable for fluidisation is provided. A mass 20 of the coated seeds of FIG. 1 is placed in the container and air or other gas introduced through the base 22 of the container 18 as shown by arrows 24 so as to fluidise the mass 20. First, a stable suspension of solvent/catalyst or precursor and graphite is made, and a layer of the suspension sprayed on to the fluidised particles through spraying unit 26. Thereafter, through the same spraying unit 26, a separating medium is applied to the fluidised particles. A coated particle or granule is produced.

An example of the coated particle or granule which is produced is illustrated by FIG. 3. Referring to this Figure, the coated particle or granule comprises diamond seed 10, a solvent/metal coating 12, a layer 14 of solvent/catalyst or precursor and graphite and an outer layer 16 of a separating medium. If a precursor of the solvent/catalyst is used, then the granules may be treated to reduce the precursor to the solvent/catalyst prior to the next step. The solvent/catalyst 12 may be different to the solvent/catalyst of layer 14.

Referring to FIG. 4, the granules 28 are placed in a reaction capsule 30 of a high pressure/high temperature apparatus together with a third phase or transmitting medium 32. The contents of the capsule are compacted to ensure that there are no spaces or gaps. The loaded capsule is then placed in the reaction zone of the high temperature/high pressure apparatus and subjected to diamond synthesis conditions. Under these conditions, graphite dissolves in the solvent/catalyst and migrates to the diamond seed. Growth on the diamond seed takes place. The diamond seed in each granule, encapsulated and isolated as it is, is exposed to a uniform surrounding composition of solvent/catalyst and graphite and thus uniform growth on the diamond takes place. The diamond which is recovered from each granule is large and of good crystal growth and shape.

What is claimed is:

1. A method of producing a plurality of discrete ultra-hard abrasive particles, comprising:
    providing a plurality of granules, each comprising one ultra-hard abrasive particle only, a precursor for the abrasive particle and a solvent/catalyst for the abrasive particle or a precursor of the solvent/catalyst,
    applying a separating medium as a coating to the granules;
    placing the granules with the separating medium between adjacent granules in the reaction zone of a high pressure/high temperature apparatus,
    subjecting the contents of the reaction zone to elevated temperature and pressure conditions at which the ultra-hard abrasive particle is crystallographically stable,
    recovering thus treated material from the reaction zone, and
    removing the separating medium in the treated material to produce a plurality of discrete abrasive particles.

2. A method according to claim 1, wherein the solvent/catalyst or precursor of the solvent/catalyst and the precursor of the ultra-hard abrasive particle are provided in layer form or as a mixture in the granules.

3. A method according to claim 1, wherein the solvent/catalyst or precursor of the solvent/catalyst and the precursor of the ultra-hard abrasive particle are all provided in powder form in the granules.

4. A method according to claim 1, wherein the ultra-hard abrasive particle is selected from the group consisting of diamond and cubic boron nitride.

5. A method according to claim 1, wherein the ultra-hard abrasive particle is diamond and a precursor of the solvent/catalyst is present in the granules.

6. A method according to claim 5, wherein the precursor of the solvent/catalyst is an oxide of a metal solvent/catalyst or a compound which reduces or pyrolises to an oxide of a metal solvent/catalyst.

7. A method according to claim 6, wherein the precursor of the solvent/catalyst is selected from the group consisting of iron oxide, cobalt oxide, nickel oxide, and a mixture thereof.

8. A method according to claim 6, wherein the granules are heat treated to reduce the precursor of the solvent/catalyst to a metal prior to subjecting the granules to the high temperature/high pressure sintering.

9. A method according to claim 1, wherein the ultra-hard abrasive particle in at least some of the granules is provided with a layer of solvent/catalyst prior to forming the granules.

10. A method according to claim 9, wherein the solvent/catalyst is a metal solvent/catalyst and is applied to the abrasive particle by electroless coating.

11. A method according to claim 1, wherein the coating is applied by spray coating the ultra-hard abrasive particles in a fluidized medium.

12. A method according to claim 1, wherein the separating medium is selected from the group consisting of salt, graphite, hexagonal boron nitride, a carbonate, an oxide and a phosphate.

13. A method according to claim 1, wherein the ultra-hard abrasive particle is diamond and the separating medium is molybdenum.

14. A method according to claim 1, wherein the elevated temperature and pressure sintering conditions are a pressure of 3 to 8 GPa and a temperature of 1000 to 2100° C.

* * * * *